United States Patent [19]

Bateman

[11] 3,716,089
[45] Feb. 13, 1973

[54] FEEDING ARRANGEMENT FOR SHREDDING AND BAGGING DEVICE

[76] Inventor: James R. Bateman, 1905 W. Court St., Kankakee, Ill. 60901

[22] Filed: Oct. 7, 1971

[21] Appl. No.: 187,417

[52] U.S. Cl. ............... 146/192, 146/124, 56/501, 56/12.8, 241/186 R
[51] Int. Cl. ......................... B26d 4/28, B02c 18/00
[58] Field of Search ...... 146/124, 192, 107; 241/186; 56/501, 12.8, DIG. 8

[56] References Cited

UNITED STATES PATENTS

| 2,955,403 | 10/1960 | McKee | 56/DIG. 8 |
| 3,240,247 | 3/1966 | Lautsenheiser | 146/107 |
| 3,527,278 | 9/1970 | Johnson, Jr. | 146/124 |

Primary Examiner—Willie G. Abercrombie
Attorney—Wolff, Hubbard, Leydig, Voit & Osann

[57] ABSTRACT

A device for shredding and bagging leaves and other yard and garden waste which includes a chamber having a horizontal rotary blade and arranged close to the ground with an inlet opening at the top and a conduit at the side for discharge of the shredded material. Communicating with the inlet opening is a flaring ramp which extends downwardly into ground engagement at a shallow angle so that leaves and the like may be swept from the ground directly into the inlet opening. A shield in the form of a small housing open at the front communicates with the ramp to prevent direct vertical access to the blade in the chamber. After shredding, the material is discharged from the conduit into a receiving bag made of thin plastic or the like which is supported on the ground alongside the ramp.

7 Claims, 5 Drawing Figures

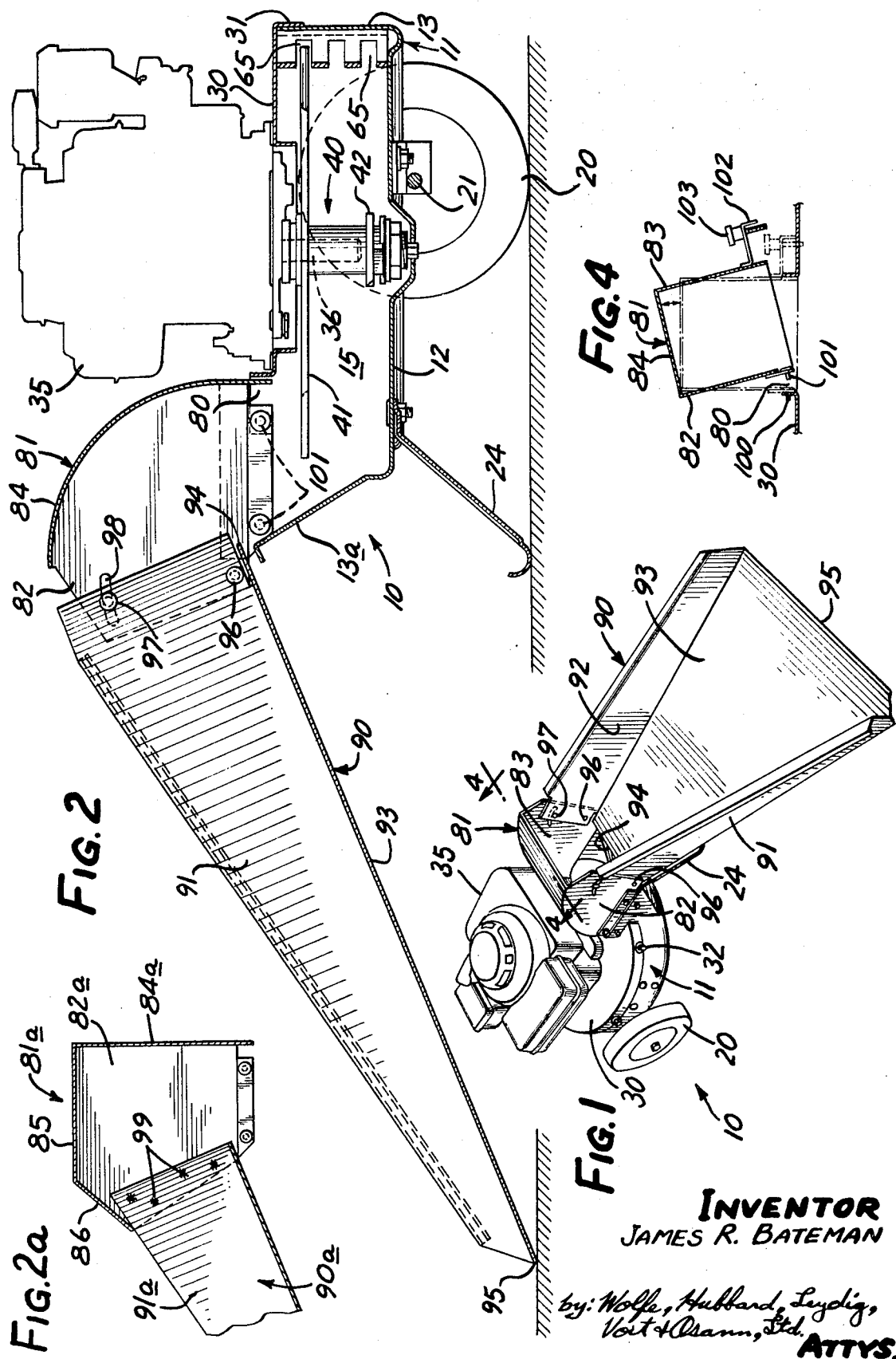

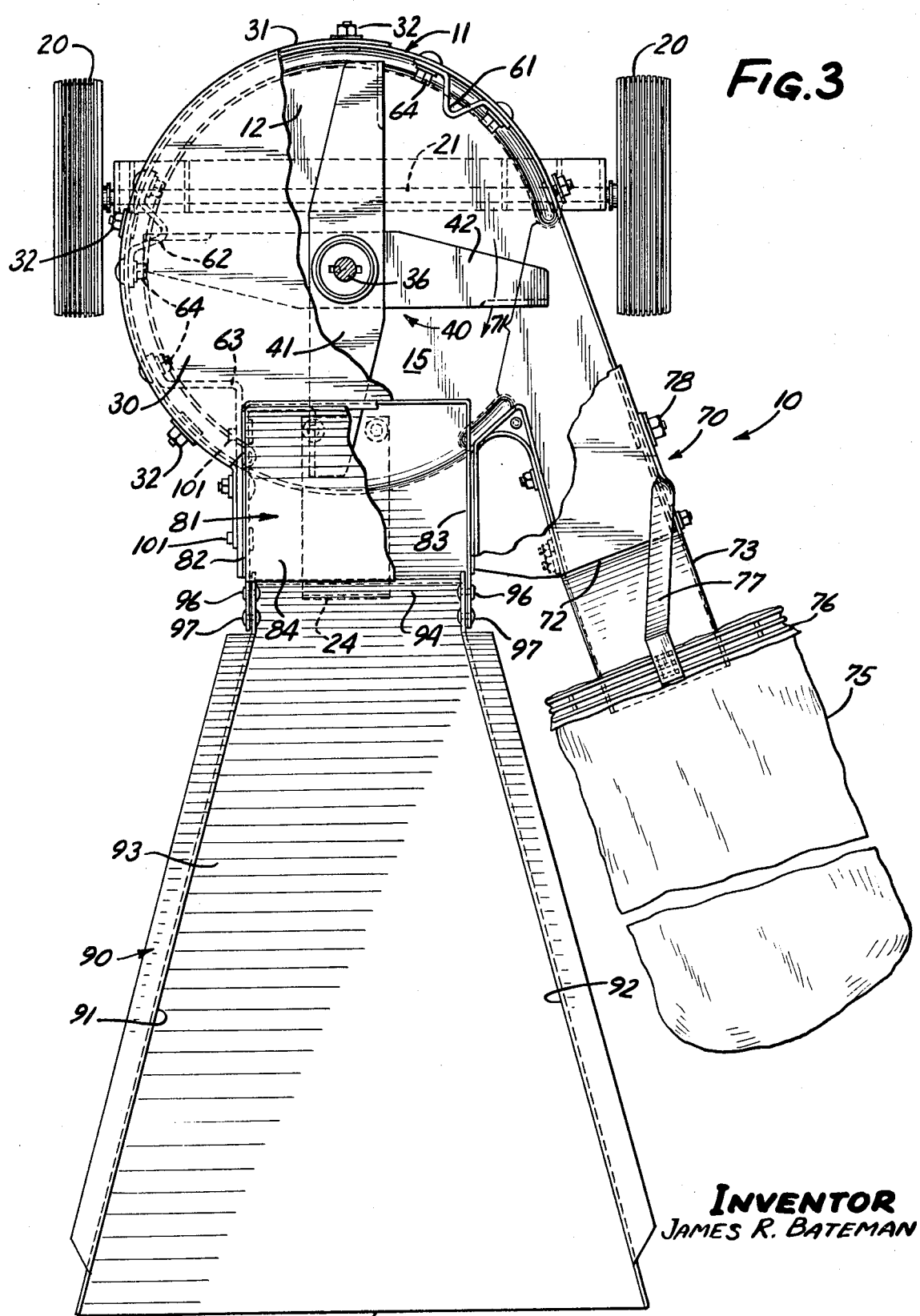

FEEDING ARRANGEMENT FOR SHREDDING AND BAGGING DEVICE

It is an object of the present invention to provide a feeding arrangement for a shredding and bagging device which permits leaves and the like to be swept upwardly from ground level at a shallow angle directly into the inlet opening of a chamber which includes the shredding blade. It is a general object of the invention to facilitate the loading of a shredding device and which makes it unnecessary to elevate leaves and other garden waste into a hopper.

It is another object of the device to provide a shredding-bagging device which is capable of utilizing both a hopper and a loading ramp and in which one may be substituted for the other quickly and easily. It is yet another object to provide a loading and feeding arrangement for a shredder of the rotary blade type which is safe to use and which is so constructed as to inhibit direct vertical access to the shredding blade or blades.

Other objects and advantages of the invention will become apparent upon reading the attached detailed description and upon reference to the drawings in which:

FIG. 1 is a general perspective view of a shredding and bagging device including a feeding arrangement constructed in accordance with the invention.

FIG. 2 is an elevational view, in cross section, of the device shown in FIG. 1 and looking along the line 2—2 in FIG. 3.

FIG. 2a shows use of a box type housing.

FIG. 3 is a plan view with certain portions removed looking along the broken section line 3—3 in FIG. 2.

FIG. 4 is a fragmentary sectional diagram showing installation of the ramp assembly into clamped position and looking along line 4—4 in FIG. 1.

While the invention has been described in connection with a preferred embodiment, it will be understood that I do not intend to be limited to the particular embodiment shown but intend, on the contrary, to cover the various alternative and equivalent constructions which may be included within the spirit and scope of the appended claims.

Turning now to the drawings there is shown a shredding and bagging device 10 which includes a base member 11 which is supported horizontally above the ground and which is of shallow cup-shaped construction having a bottom wall 12 and a generally circular side wall 13 which define a shredding chamber 15. For spacing the chamber close to the ground and for permitting it to be moved from one location to another, a pair of ground wheels 20 are provided supported on an axle 21, the latter being suitably secured to the underside of the base. Spaced from the wheels is a skid 24 which, on rocking upwardly, permits the assembly to be trundled along the ground much in the manner of a wheelbarrow.

Superimposed upon the base 11 is a cover plate 30 which is preferably of circular outline, conforming to the shape of the base, and having a downwardly turned lip 31 which extends enclosingly about the base. A series of clamping bolts or studs 32 clamp the cover plate to the base.

Centrally mounted upon the cover plate 30 is an engine 35 of the vertical shaft type having a shaft 36 which projects into the space 15 within the base.

Mounted upon the shaft 36 is rotor 40 having an upper blade 41 and a lower blade 42 formed of flat pieces of steel welded to a hollow cylindrical hub, the blades being oriented at right angles to one another in fixed phase position.

Cooperating with the tip portions of the blades are three vertically arranged breaker elements 61, 62, 63 which are secured to the inside wall of the base by means of bolts 64 and which have horizontally arranged notches 65 which register with the blade tips. Since material deposited in the chamber tends to be thrown outwardly by centrifugal force, the breakers serve to hold the material against rotation while being acted upon by the blades.

For the purpose of conducting the shredded material outwardly, an opening in the wall of the base communicates with a discharge conduit 70 having an opening 71 in communication with the shredding chamber and having an orifice 72. Hinged to the conduit and forming a substantial continuation of the upper wall thereof is a deflector plate 73 of inverted channel shape.

Alined with the axis of the conduit is a receiving bag 75, the mouth of which is secured to a hoop 76 which is supported upon a bracket 77 secured to the conduit by a bolt 78. It will be noted in FIG. 3 that the breaker 61 is located well upstream of the opening 71 so that material does not tend to get hung up at the edge of the opening. It will also be noted that the conduit has a slightly flared body of a length which approximates the radius of the base. This not only contributes to safety but as a result of these factors, material is discharged freely into the receiving bag thereby overcoming the clogging which has been characteristic of devices of this general type in the past.

In accordance with the present invention an opening, defining a receptacle, is formed in the coverplate 30 communicating with a ramp assembly having flaring sidewalls and which extends downwardly at a shallow angle into engagement with the ground. More specifically I have provided a hood or housing establishing a path of communication with the receptacle while inhibiting direct vertical access to the blade and with a ramp of flared construction merging with the housing at its upper end and having its flared lower end extending at a shallow angle to rest in contact with the ground. Thus referring to the drawings there is, formed in the cover plate 30, an opening 80 of rectangular profile and which serves as a receptacle for waste material. Fitted to the receptacle is a housing or hood 81 having sidewalls 82, 83 and a combined back and top wall 84. To provide a sufficiently large cross sectional area at the inlet in view of the space taken up by the engine, the sidewall 13 of the base is angled outwardly as indicated at 13a (FIG. 2) and the housing is open over its entire bottom surface. Extending from the front of the housing is a flared ramp 90 having sidewalls 91, 92 and a bottom wall 93 extending at a shallow angle from a narrow end or throat 94 at the top to a wide edge 95 which rests in contact with the ground. The sidewalls 91, 92 at the upper or narrow end are dimensioned to mate and merge smoothly with the sidewalls 82, 83 of the housing. Provision is made for limited rocking movement of the ramp with respect to the housing in order to insure that the edge 95 of the ramp is free, under all conditions of contour, to rest in gravity contact with the ground. Such freedom of movement is obtained by a pair of alined hinge bolts 96. To secure the respective sidewalls together in overlapping relation and to limit the degree of rocking, bolts 97 are used, spaced from the hinge bolts 96 and movable within the limits of registering slots 98.

For the purpose of removably securing the ramp assembly with respect to the ground supported portion of the device, means are provided for keyed engagement between the housing 81 and the cover plate 30, with a clamping screw to hold the members assembled together. Thus, referring to FIG. 4, the cover plate is provided with an upstanding flange having openings 100 into which pins 101 on the wall 82 of the housing may be registeringly inserted. For subsequently clamping the opposite side of the housing in place, a clamping plate 102 of Z configuration is used, one edge of which is welded to the wall 83 of the housing while the other edge projects downwardly for seating on the cover plate. A clamping, or hand, screw 103 penetrates the plate 102 for reception in a threaded hole in the cover plate. When it is desired to remove the ramp assembly it is a simple matter to unscrew the screw 103 following which the assembly may be tipped slightly to permit retraction of the pins 101. A hopper, dimensioned to fit the opening, and having a similar set of pins and similar clamping plate screw, may then be substituted for the ramp assembly as disclosed in copending With the ramp assembly attached, the shredding and bagging device is wheeled to a pile of leaves which are swept upwardly using a conventional type of broom along the surface 93 and into the housing 81 where the leaves drop through the opening 80 into engagement with the rotary blades 41, 42. By locating the opening 80 radially inward to the maximum degree permitted by the profile of the engine, use can be made of the vacuum created by the rotating blade assembly. In any event, due to the weight of the waste material or to slight suction, or both, the material is fed into the shredding chamber 15 where it is forced outwardly against the breakers 61–63 by reason of centrifugal force and there acted upon by the tips of the blades with shearing action and with subsequent forcible ejection through the conduit 70 for depositing in the receiving bag 75.

In a preferred from of the invention a box type housing or hood may be used in lieu of the housing 81 of rounded profile shown in FIG. 2. In the modified construction set forth in FIG. 2a, and where the subscript *a* is used to denote corresponding elements, the housing 81a has side walls 82a (only one shown), a back wall 84a and a top wall 85. The top wall 85 is preferably elevated above the side walls 91a (only one shown) of the ramp 90a. Secured to the front of the top wall is an integral visor or shield 86 with slopes downwardly terminating at the upper edges of the sidewall of the ramp. For the sake of simplicity, and to minimize the cost, the hinge joint 96 (FIG. 2) may be dispensed with and the side walls 91a of the ramp may be spot welded or otherwise secured at their upper ends to the respective side walls 82a of the housing as shown at 99. The housing structure shown in FIG. 2a performs the same receiving function as the housing in FIG. 2, the main differences being enlargement of volume and more effective shielding against direct or inadvertent access to the rotating blade structure. Moreover, the use of the visor 86 provides, with the upper end of the ramp a more well defined vertical entry way so that the blade suction is employed to maximum advantage in the movement of leaves or other light trash through the housing and into the region of the blades. Enlargement of the volume of the housing is desirable since the housing is better able to accommodate a condition where material is swept into the housing at a faster rate than it can be drawn into engagement with the blades.

It is found that the shredded material, exiting from the conduit at a high velocity, tends to be caught, or deposited, in the bottom of the bag where it builds up as a compact mass. Very little of the material, in the form of dried leaves or the like, is found to blow back out of the mouth of the bag even as the bag gradually reaches the filled condition. In the case of dried leaves and other normal wastes of yard or garden, a reduction in volume of approximately 10:1 is achieved.

After the leaves in the pile have been disposed of, the device may be roller to a new working position where the process may be repeated without necessity for lifting or guiding the material into an elevated hopper.

The term "engine" as used herein refers to any rotational power source.

While the term "shredding and bagging" machines has been used, it will be apparent that the ramp may be used even though the shredded material is discharged into a compact pile rather than being bagged.

What I claim is:

1. In a shredding and bagging machine for yard usage, the combination comprising a base of shallow cup shape having a bottom wall and a circular side wall defining a shredding chamber, transport means for supporting the base in horizontal position slightly upraised above the ground, a cover plate fitted to the base for enclosing the same, an engine mounted on the cover plate and having a drive shaft which extends into the base, a rotor mounted on the shaft including a blade having tip portions extending to the region of the sidewall, a plurality of stationary breaker members at spaced positions on the sidewall and having horizontal notches formed therein for registering with the tip portions of the blade, means including a discharge conduit penetrating the sidewall for forcible discharge of the shredded material, the cover plate having a receptacle for feeding material into the chamber, a ramp of flaring construction having sidewalls defining a narrow upper end and a wide lower end, and means for securing the ramp with respect to the receptacle so that the narrow end communicates with the receptacle and so that the wide end extends downwardly at a shallow angle into engagement with the ground thereby permitting leaves or the like lying on the ground to be swept upwardly into the receptacle.

2. The combination as claimed in claim 1 which includes a housing fitted to the cover plate having side and top walls but open at the bottom for communication with the receptacle and open at the front, the sidewalls of the ramp being positioned and dimensioned to merge with the sidewalls of the housing.

3. The combination as claimed in claim 2, the housing including readily removable means for clamping the same in position over the receptacle.

4. The combination as claimed in claim 2 in which the housing has a height which is greater than the height of the sidewalls of the ramp and in which the sidewalls are respectively secured together in overlapping relation.

5. The combination as claimed in claim 4 in which the housing has a vertically extending shield interposed between the top wall of the housing and the sidewalls of the ramp.

6. The combination as claimed in claim 1 in which the ramp has a horizontal hinge connection at its upper end permitting limited rise and fall to insure that the lower end of the ramp will seat on the ground by action of gravity notwithstanding variations in ground contour.

7. In a shredding and bagging machine for yard usage the combination comprising a base of hollow cylindrical construction having a bottom wall, top wall and sidewall defining a shredding chamber, transport means for supporting the base in horizontal position slightly upraised above the ground, a horizontal rotary blade in the chamber, an engine for rotating the blade, a plurality of stationary breaker members cooperating with the tips of the blades for shredding action, an inlet opening defining a receptacle in the top wall, a discharge conduit penetrating the sidewall for forcible discharge of the shredded material, ramp assembly of flared construction having vertical sidewalls defining a narrow upper end and a wide lower end, means for securing the ramp with respect to the receptacle so the ramp communicates at its upper end with the receptacle and extends at a shallow angle downwardly into engagement with the ground for sweeping of leaves and the like directly from the ground along the ramp and into the receptacle, and a hood spaced above the receptacle and under which the swept material passes for inhibiting direct vertical access to the blade, the sidewalls being of limited height at the lower end and a height which corresponds to the vertical dimension of the hood at the upper end.

* * * * *

Disclaimer 3,716,089.—*James R. Bateman*, West Chicago, Ill. FEEDING ARRANGEMENT FOR SHREDDING AND BAGGING DEVICE. Patent dated Oct. 31, 1972. Disclaimer filed May 16, 1974, by the assignee, *Roper Corporation*.

Hereby enters this disclaimer to claim 1 of said patent.

[*Official Gazette September 24, 1974.*]